United States Patent
Bastian et al.

(10) Patent No.: US 10,887,292 B2
(45) Date of Patent: Jan. 5, 2021

(54) OBFUSCATED HAPTIC INTERFACES WITH NATURAL INTERACTION STEGANOGRAPHY

(71) Applicant: International Business Machines Corporation, Armonk, NY (US)

(72) Inventors: David C. Bastian, Addison, IL (US); Aaron K. Baughman, Silver Spring, MD (US); Nicholas A. McCrory, Sacramento, CA (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 15/955,946

(22) Filed: Apr. 18, 2018

(65) Prior Publication Data

US 2019/0327215 A1    Oct. 24, 2019

(51) Int. Cl.
*G06F 21/00* (2013.01)
*H04L 29/06* (2006.01)
*H04W 12/02* (2009.01)
*H04L 9/08* (2006.01)
*G06F 3/01* (2006.01)
(Continued)

(52) U.S. Cl.
CPC .......... *H04L 63/0442* (2013.01); *G06F 3/016* (2013.01); *H04L 9/0825* (2013.01); *H04W 12/02* (2013.01); *G06K 9/00778* (2013.01); *G10L 25/78* (2013.01); *H04L 2209/80* (2013.01)

(58) Field of Classification Search
CPC .................................................. H04L 63/0442
See application file for complete search history.

(56) References Cited

U.S. PATENT DOCUMENTS 8,091,114 B2 * 1/2012 Lommock ............... G06F 21/55 726/1
9,898,610 B1 * 2/2018 Hadsall ................... G06K 9/20
(Continued)

FOREIGN PATENT DOCUMENTS

WO    2015148693 A1    10/2015

OTHER PUBLICATIONS

"Tools for Large-Scale Parser Development", Proceedings of the COLING-2000 Workshop on Efficiency In Large-Scale Parsing Systems, Jul. 2000, 1 page.
(Continued)

*Primary Examiner* — Harris C Wang
(74) *Attorney, Agent, or Firm* — Robert J. Shatto; Maxine L. Barasch; Keohane & D'Alessandro, PLLC

(57) ABSTRACT

Disclosed embodiments provide techniques for improvements in electronic communications. A mobile electronic device associated with a user measures crowd density proximate to the user. When the crowd density exceeds a threshold, a haptic signal, such as a vibration or pneumatic output, is discretely provided to the user. After issuing the haptic signal, the device listens for false data. False data is data entered by the user that is not part of the expected data sequence. The false data is used to obfuscate the true data. The randomness of the false data can be used to generate a keypair used for communication. The keypair is used for asymmetric encryption that provides an extra level of security for electronic communications from the mobile electronic device.

20 Claims, 12 Drawing Sheets

(51) Int. Cl.
*G10L 25/78* (2013.01)
*G06K 9/00* (2006.01)

(56) References Cited

U.S. PATENT DOCUMENTS

| | | | |
|---|---|---|---|
| 2006/0123462 A1* | 6/2006 | Lunt | H04L 63/102 726/1 |
| 2008/0235788 A1* | 9/2008 | El Saddik | G06F 21/36 726/18 |
| 2009/0055654 A1 | 2/2009 | Dunn et al. | |
| 2009/0088138 A1* | 4/2009 | Jung | H04M 1/642 455/414.1 |
| 2012/0151218 A1* | 6/2012 | Singh | G06F 21/62 713/183 |
| 2012/0166437 A1* | 6/2012 | Esteve Balducci | G01C 21/32 707/736 |
| 2013/0088605 A1* | 4/2013 | Quarfordt | H04L 67/1044 348/207.1 |
| 2013/0095855 A1* | 4/2013 | Bort | G06T 17/05 455/456.2 |
| 2014/0059674 A1* | 2/2014 | Sun | G06F 21/31 726/19 |
| 2014/0109224 A1* | 4/2014 | Yan | G06F 21/56 726/23 |
| 2014/0365883 A1* | 12/2014 | Ramsay | G06F 21/32 715/702 |
| 2015/0113666 A1* | 4/2015 | Buck | G06F 21/554 726/28 |
| 2016/0164681 A1* | 6/2016 | Jiang | H04L 9/3226 713/183 |
| 2016/0315682 A1* | 10/2016 | Liu | H04W 24/08 |
| 2016/0370863 A1* | 12/2016 | Jones | G06F 3/016 |
| 2017/0032630 A1* | 2/2017 | Gervais | G08B 6/00 |
| 2017/0068860 A1* | 3/2017 | Adekola | G07C 11/00 |
| 2017/0126631 A1* | 5/2017 | Vikramaratne | H04L 63/0428 |
| 2018/0224989 A1* | 8/2018 | Deasy | G06F 3/023 |
| 2019/0327215 A1* | 10/2019 | Bastian | G06F 3/01 |

OTHER PUBLICATIONS

"Visual Computing", Research Areas, www.disneyresearch.com, 2017, 12 pages.

Covarrubias et al., "Immersive VR for natural interaction with a haptic interface for shape rendering", IEEE, 2015, 8 pgs.

* cited by examiner

1100

However, when the threshold criteria are met, you might find that the processor may determine whether the data storage medium unit has a threshold amount of free storage space available to perform diagnostic testing which may include for example intrusive error checking. Our goal is to have the computer storage space that includes for example sufficient disk sectors being available on a disk. When there is insufficient computer storage space, then the processor may continue operating the data storage medium unit until, for example, enough computer storage space becomes available.

OBFUSCATED HAPTIC INTERFACES WITH NATURAL INTERACTION STEGANOGRAPHY

FIELD OF THE INVENTION

The present invention relates generally to electronic communication and, more particularly, to obfuscated haptic interfaces with natural interaction steganography.

BACKGROUND

Computing is wearable and "on the go" with mobile devices. Humans can bring symbiotic computing ability to any environment they operate. During communication of private information with a device naturally, such as through speech or gesture, humans can perceive the information. Privacy is lost since a human can easily eavesdrop on a conversation with a computing device. It is therefore desirable to have improvements in electronic communication that can enhance security and privacy.

SUMMARY

In one embodiment, there is provided a computer-implemented method for obfuscating communication of a user, comprising: receiving user input on an electronic communication device; measuring a crowd density proximate to the electronic communication device; responsive to a measure of crowd density, initiating a series of haptic stimuli on the electronic communication device, wherein for each instance of haptic user stimulus the method includes: determining an indication of a start of false user input; processing subsequent user input as false user input; determining an indication of a termination of false user input; and processing subsequent user input as true user input.

In another embodiment, there is provided an electronic computing device comprising: a processor; a memory coupled to the processor, the memory containing instructions, that when executed by the processor, perform the steps of: receiving user input on an electronic communication device; measuring a crowd density proximate to the electronic communication device; responsive to a measure of crowd density, initiating a series of haptic stimuli on the electronic communication device, wherein for each instance of haptic user stimulus the processor performs the steps of: determining an indication of a start of false user input; processing subsequent user input as false user input; determining an indication of a termination of false user input; and processing subsequent user input as true user input.

In yet another embodiment, there is provided a computer program product for an electronic communication device comprising a computer readable storage medium having program instructions embodied therewith, the program instructions executable by a processor to cause the electronic communication device to: receive user input on an electronic communication device; measure a crowd density proximate to the electronic communication device; responsive to a measure of crowd density, initiate a series of haptic stimuli on the electronic communication device, wherein for each instance of haptic user stimulus the instructions further cause the processor to: determine an indication of a start of false user input; process subsequent user input as false user input; determine an indication of a termination of false user input; and process subsequent user input as true user input.

BRIEF DESCRIPTION OF THE DRAWINGS

Features of the disclosed embodiments will be more readily understood from the following detailed description of the various aspects of the invention taken in conjunction with the accompanying drawings.

FIG. 11 shows an example of a bigram analysis in accordance with embodiments of the present invention.

Figure 1:
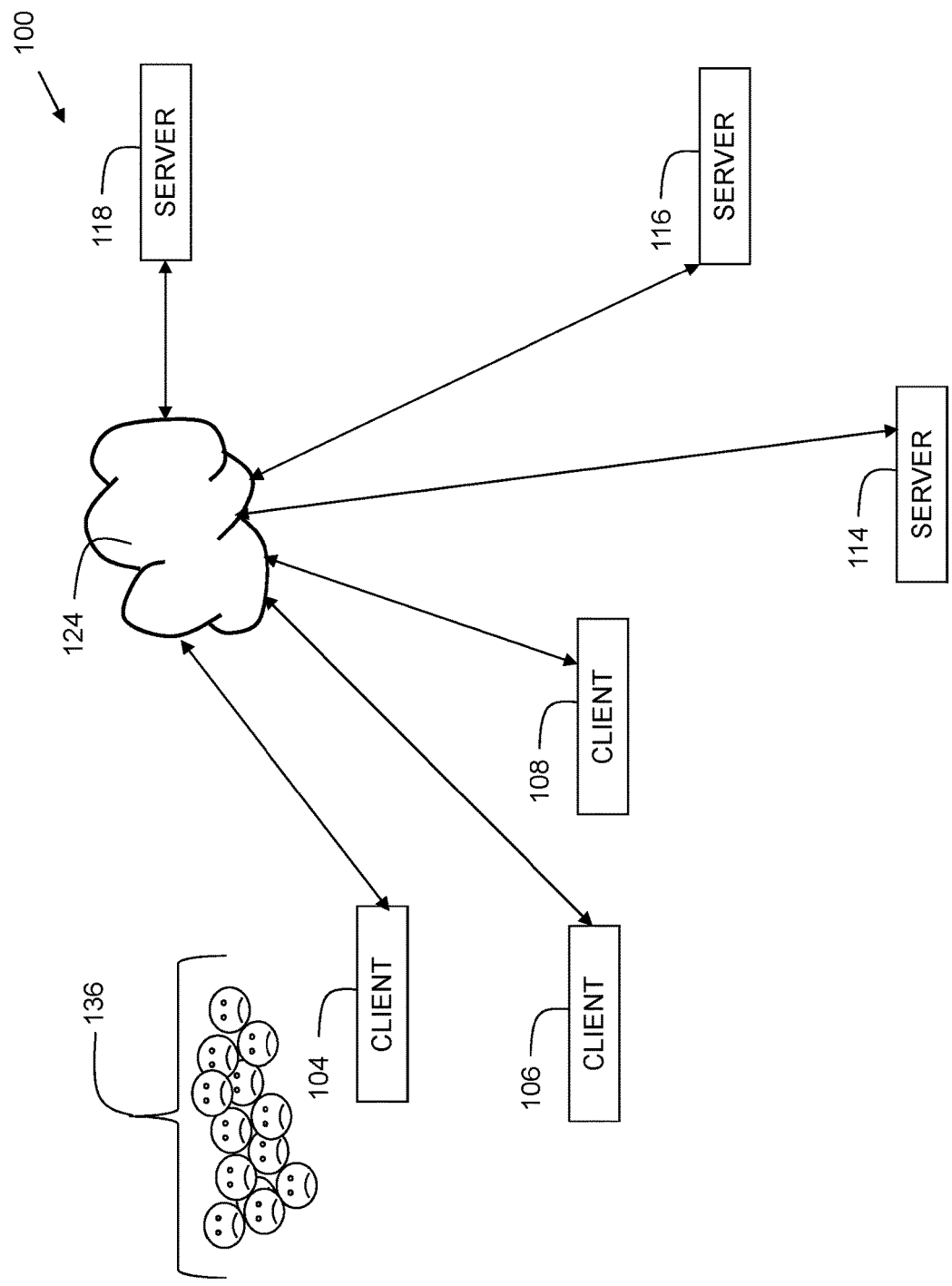
FIG. 1 is a diagram of an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for improvements in electronic communications. A mobile electronic device associated with a user measures crowd density proximate to the user. In some embodiments, people within three meters of the electronic device are considered as being proximate to the user. In embodiments, the crowd density is the number of people detected as being proximate to the user. When the crowd density exceeds a threshold, a haptic signal, such as a vibration or pneumatic output (e.g., an air puff), is discretely provided to the user. In some embodiments, crowd density is measured as the number of people within a predefined area. In some embodiments, the area may be denoted by a circle of a given radius (e.g., three meters). The crowd density can be denoted as number of people per square meter. Referring again to the example with a radius of three meters, the resulting area is approximately 28 meters. If 10 people are detected within that radius, then a crowd density of 0.35 people per square meter is derived. As an example, disclosed embodiments can generate a haptic signal to initiate obfuscation when the crowd density is greater than or equal to 0.35 (or other suitable threshold).

After issuing the haptic signal, the device listens for false data. False data is data entered by the user that is not part of the expected data sequence. The false data is used to obfuscate the true data. The randomness of the false data can be used to generate a keypair used for communication. The keypair is used for asymmetric encryption that provides an extra level of security for electronic communications from the mobile electronic device.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a diagram 100 of an environment for embodiments of the present invention. A network 124 is shown with interconnected clients and servers. The network may be the Internet, a wide area network, a local area network, a cloud network, or any other suitable network. Servers 114, 116, and 118 are computing devices with processors and memories therein. Clients 104, 106, and 108 are client computing devices. They may be laptop computers, desktop computers, tablet computers, smartphones, PDAs, or any other suitable electronic computing devices. Client 104 is in proximity to a group of people 136.

Figure 2:
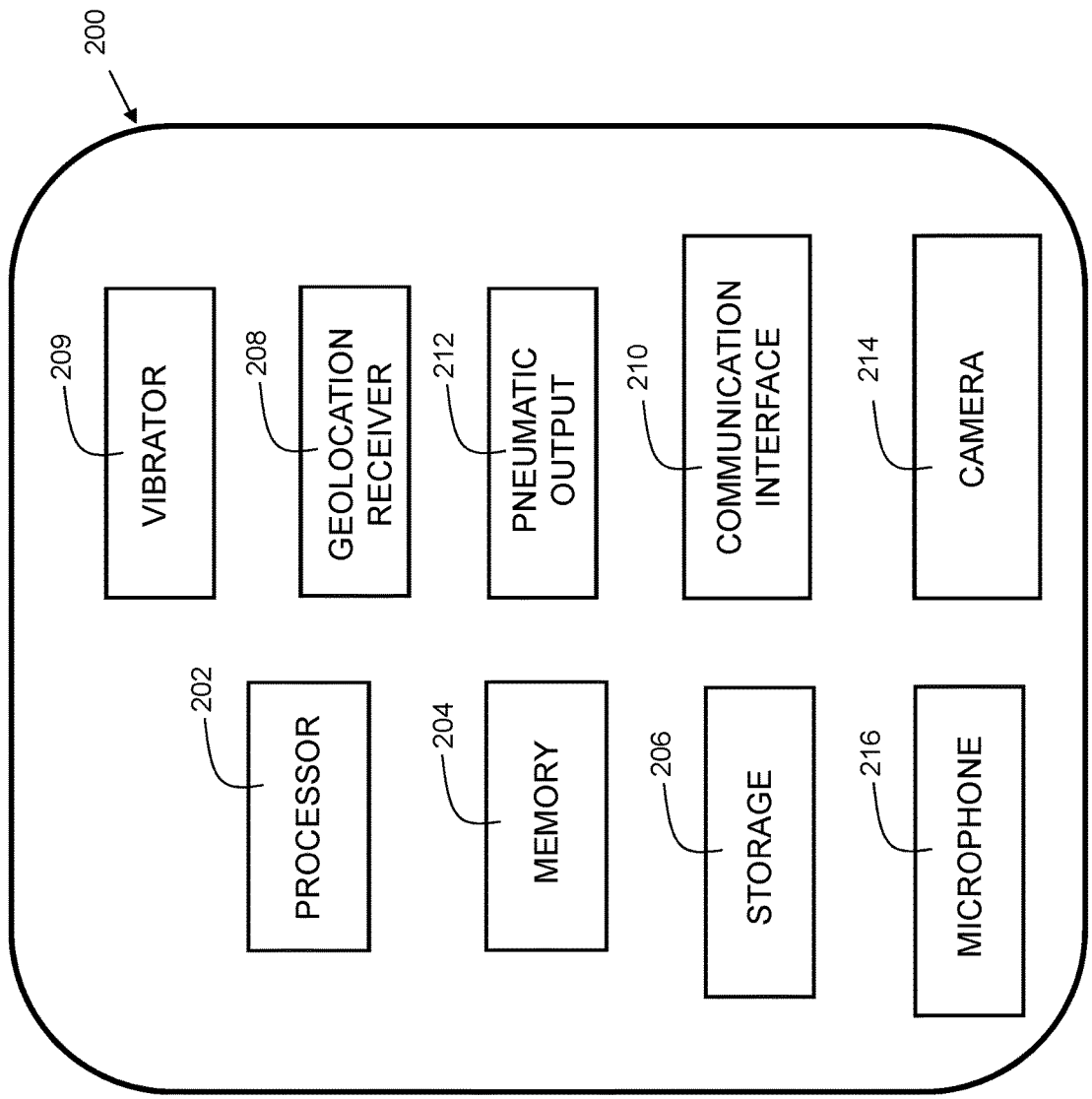
FIG. 2 is a block diagram of a device in accordance with embodiments of the present invention.

FIG. 2 is a block diagram of a device in accordance with embodiments of the present invention. Device 200 is an electronic computing device. Device 200 may be embodied as a tablet computing device or smartphone. In some embodiments, device 200 may be embodied as a wearable device such as a headset, goggles, wristwatch, or other wearable device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 stores instructions, which when executed by the processor, implement the steps of the present invention.

Device 200 may further include storage 206. In embodiments, storage 206 may include one or more magnetic storage devices such as hard disk drives (HDDs). Storage 206 may additionally include one or more solid state drives (SSDs).

Device 200 further includes geolocation receiver 208. This may operate with global positioning satellite systems, such as GPS, GLONASS, Galileo, or other suitable system.

Device 200 further includes vibrator 209. This may be a "coin"-type vibrator, an asymmetrical load affixed to a rotating shaft, a linear resonant actuator, or a pancake vibration motor, etc. In some embodiments, initiation of haptic stimuli from device 200 may include vibration.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

The device 200 may further include a pneumatic output 212. The pneumatic output is configured and disposed to electromechanically release a small puff of air via a piston or a diaphragm. In particular, embodiments such as virtual reality headsets may employ directed air ducts for imparting an air current onto the user as part of the haptic feedback mechanism. Thus, in addition to, or instead of using vibrations, sending an air current onto the user can be an effective way to discretely get the attention of a user. In some embodiments, initiation of haptic stimuli may include a pneumatic output.

The device may further include a camera 214. The camera may include a lens and a light for making a flash. In some embodiments, a crowd density is measured by performing image analysis on one or more images from the camera 214 on the device 200.

The device 200 may further include a microphone 216. In some embodiments, a crowd density is measured by performing an audio analysis on one or more audio samples from the microphone 216 on the device 200.

In some embodiments, measuring the crowd density comprises performing a radio frequency scan using communication interface 210. This can include searching for other electronic devices, such as mobile telephones (e.g., scanning for other Bluetooth® devices, and/or other wireless devices).

Figure 3:
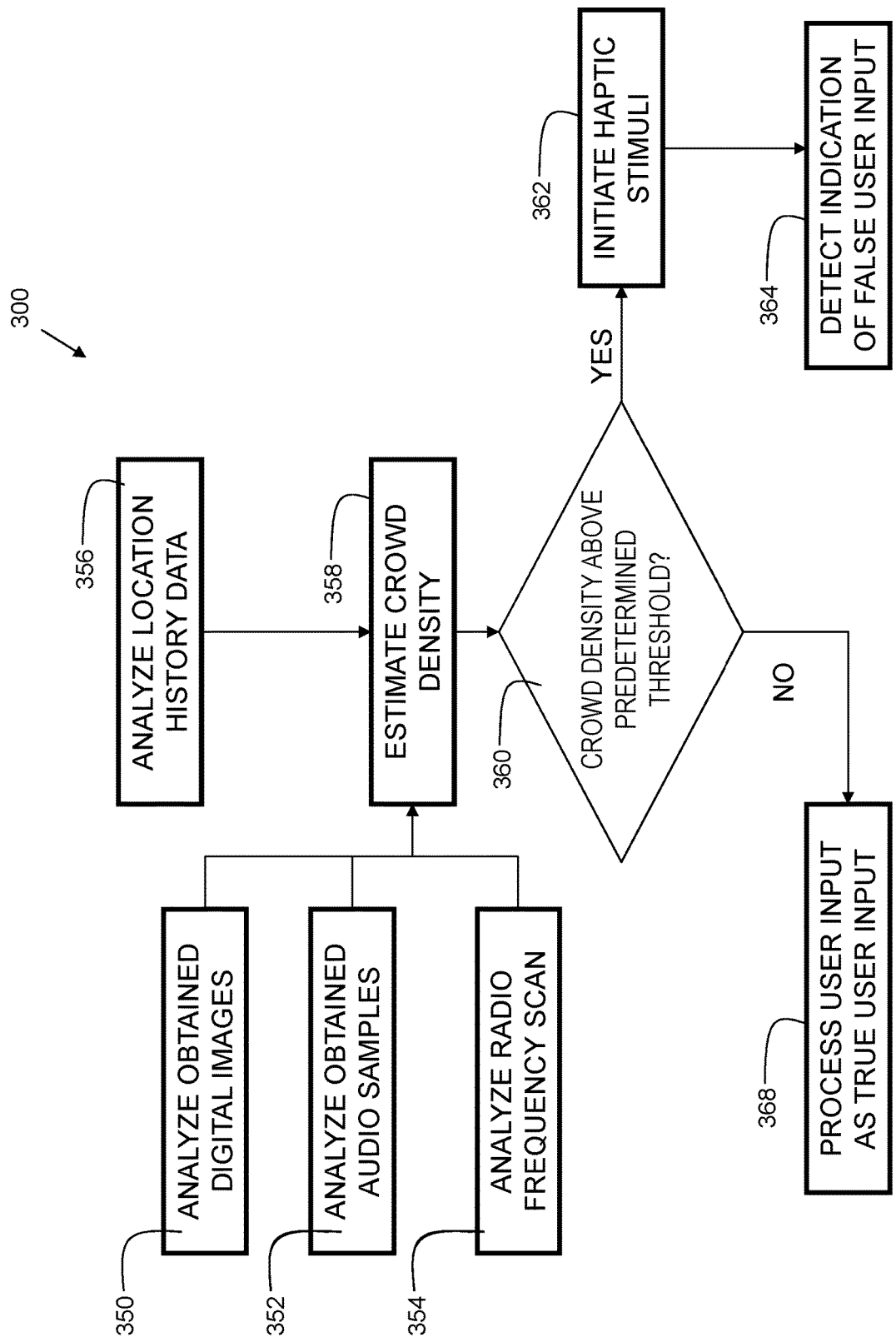
FIG. 3 is a flowchart indicating process steps for embodiments of the present invention.

FIG. 3 is a flowchart 300 indicating process steps for embodiments of the present invention. At block 350, obtained digital images are analyzed. These images can be acquired from a camera (such as 214 of device 200 in FIG. 2) on a client mobile electronic device (e.g. smartphone, tablet computer, etc.). At block 352, obtained audio samples are analyzed. The audio can be acquired from a microphone (such as 216 of device 200 of FIG. 2). At block 354, a radio frequency (RF) scan is analyzed. This can come from a radio frequency scan to search for other electronic wireless devices such as Bluetooth or WiFi frequencies (e.g., in the 2-5 GHz range). At block 358, a crowd density is estimated. This is an estimation of the number of people within a predetermined radius of the client device. The estimation may be based on the analysis of the images, the audio, and/or the RF scan. In some embodiments, at block 356, location history data is analyzed. For example, based on the historical data, an area may be recorded as a place that is typically crowded (e.g., Times Square), which may be factored into crowd density estimation and/or determination. In some embodiments, even when no crowd is detected by cameras, microphones, and/or RF scan, a haptic stimulus may still be issued if the electronic device is located in an area known to be crowded. In other embodiments, the location history data may be used to adjust predetermined thresholds for crowd density. For example, if in an area known to be crowded (by analysis of historical data), the predetermined threshold for crowd density for triggering a haptic stimulus may be reduced from a default level. Combining the known crowd information of a location along with the local sensors (camera/microphone/RF) on the user's electronic device can increase the effectiveness of disclosed embodiments.

At block 360, it is determined whether the crowd density is above a predetermined threshold. If no at block 360, then at block 368, user input is processed as true user input. The user would then use the phone as s/he normally would. If yes at block 360, then at block 362, haptic stimuli, such as a vibration or air puff, is initiated. At block 364, an indication of false user input is detected. This indication is a result of receipt of false user input from a user in response to the haptic stimuli. The false user input may be random alphanumeric characters, random numbers, a pattern chosen by the user, a series of gestures, or any other suitable sequence.

Some embodiments may determine that the input is random via a failed result from a comparison to an electronic dictionary (i.e., no matches, nor close matches, to the input are found in the dictionary). This is an example, and any suitable method of detecting randomness is included within the scope of embodiments of the invention.

Figure 4:
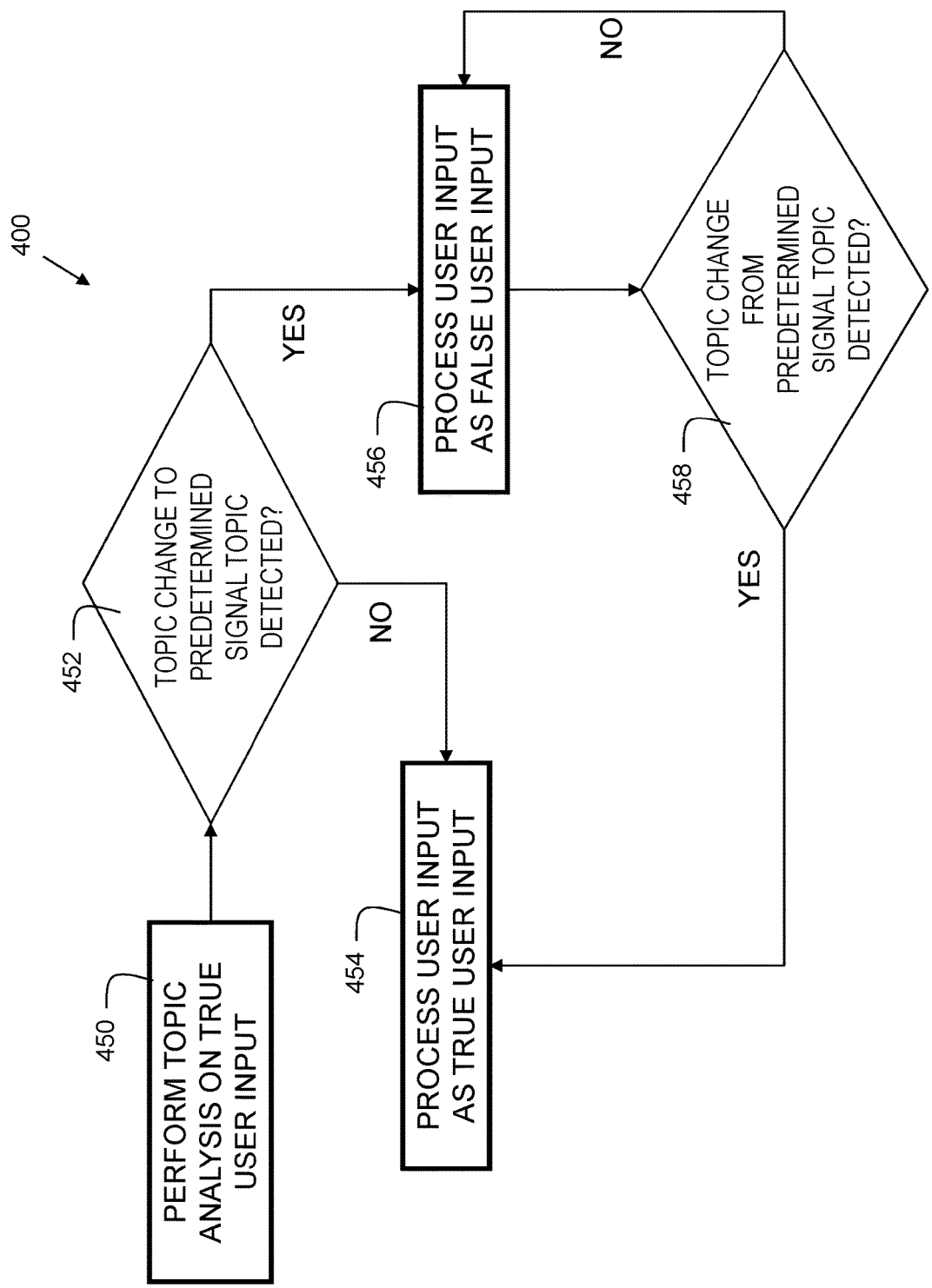
FIG. 4 is a flowchart indicating additional process steps for embodiments of the present invention.

FIG. 4 is a flowchart 400 indicating additional process steps for embodiments of the present invention. At block 450, a topic analysis is performed on the true user input. At block 452, it is determined whether a topic change to a predetermined signal topic is detected. The signal topic is a topic that signals that user input is transitioning from true to false or false to true. If not, at block 454, user input is processed as true user input. If yes at block 452, then at block 456, user input is processed as false user input. Then, at block 458, it is determined whether the currently spoken topic has changed from a predetermined signal topic. If yes, then the process proceeds to block 454. If no at block 458, then the process proceeds back to block 456.

Figure 5:
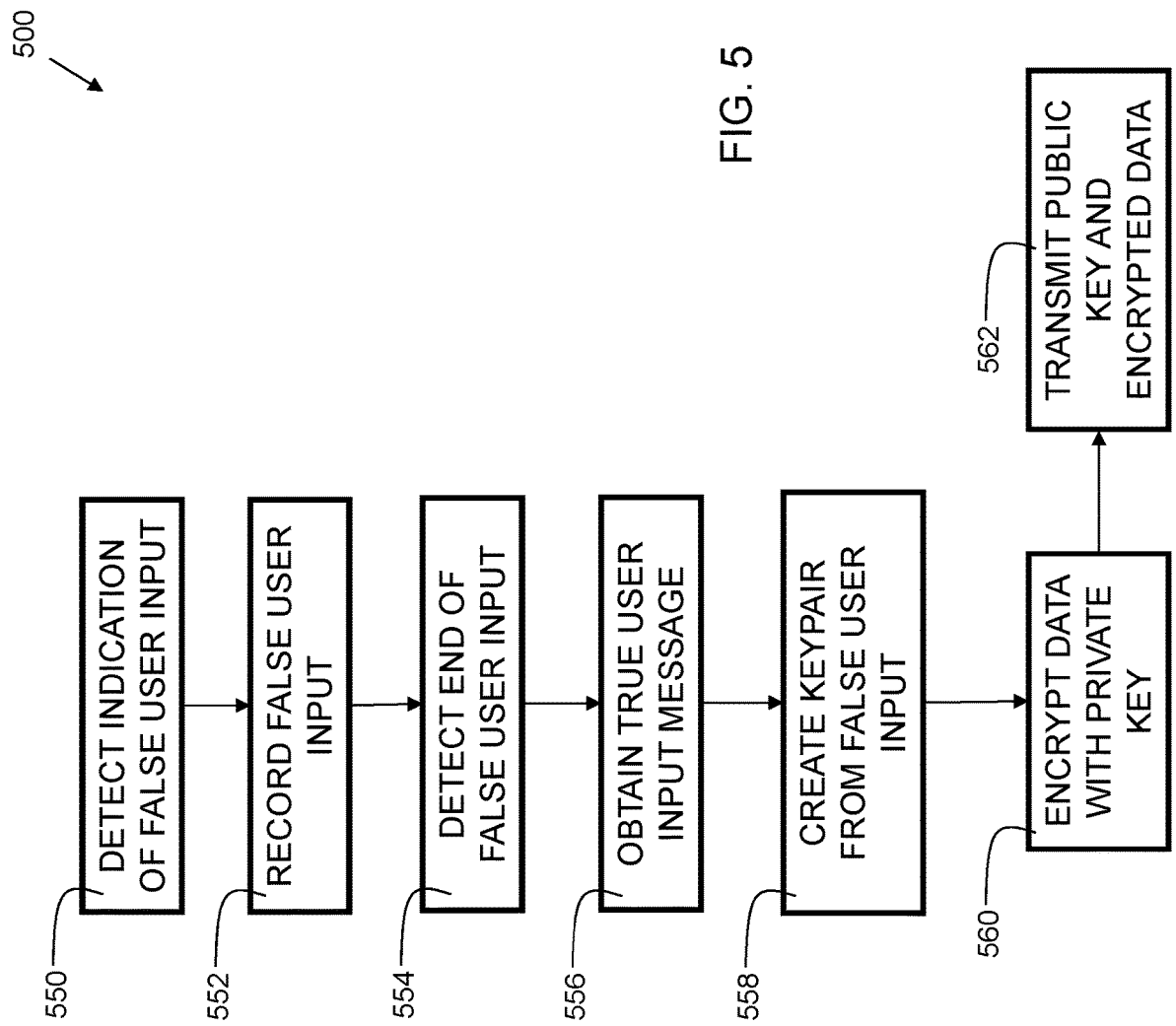
FIG. 5 is a flowchart indicating additional process steps for embodiments of the present invention.

FIG. 5 is a flowchart indicating additional process steps for embodiments of the present invention. At 550, an indication of false user input is detected. This may be transitional key entry input, gesture input, phrase input, topic input, or other suitable indication. At 552, the false user input is recorded. At 554, an end of the false user input is detected. At 556, a true user input message is obtained. At 558, a haptic keypair is generated based on the processed false user input. The haptic keypair comprises a haptic private key and a haptic public key. In some embodiments, generating a haptic keypair comprises generating a nonce based on a false user input value. In some embodiments, generating the haptic keypair further includes generating a nonce based on a false user input duration. This duration can be the time between keystrokes, gestures, or other user input elements. The natural variation in the timing of the data entry by the user can contribute to the random value of the nonce. For example, a pseudorandom number can be multiplied by the total number of milliseconds for the data entry in order to obtain an extra level of randomness.

The keypair includes a private key and a public key. At 560, the true user input is encrypted with the haptic private key. In embodiments, the encryption algorithm can include, but is not limited to, Rivest Shamir Adleman (RSA), Elliptic Curve Cryptography (ECC), El Gamal, and/or Digital Signature Algorithm (DSA). Other suitable asymmetric encryption algorithms may be used. At 562, the haptic public key and the true user input are sent to a remote computing device. This provides an extra level of security during electronic communications. In particular, use of the haptic keypair can serve to reduce the probability of a successful man-in-the-middle attack.

Figure 6:
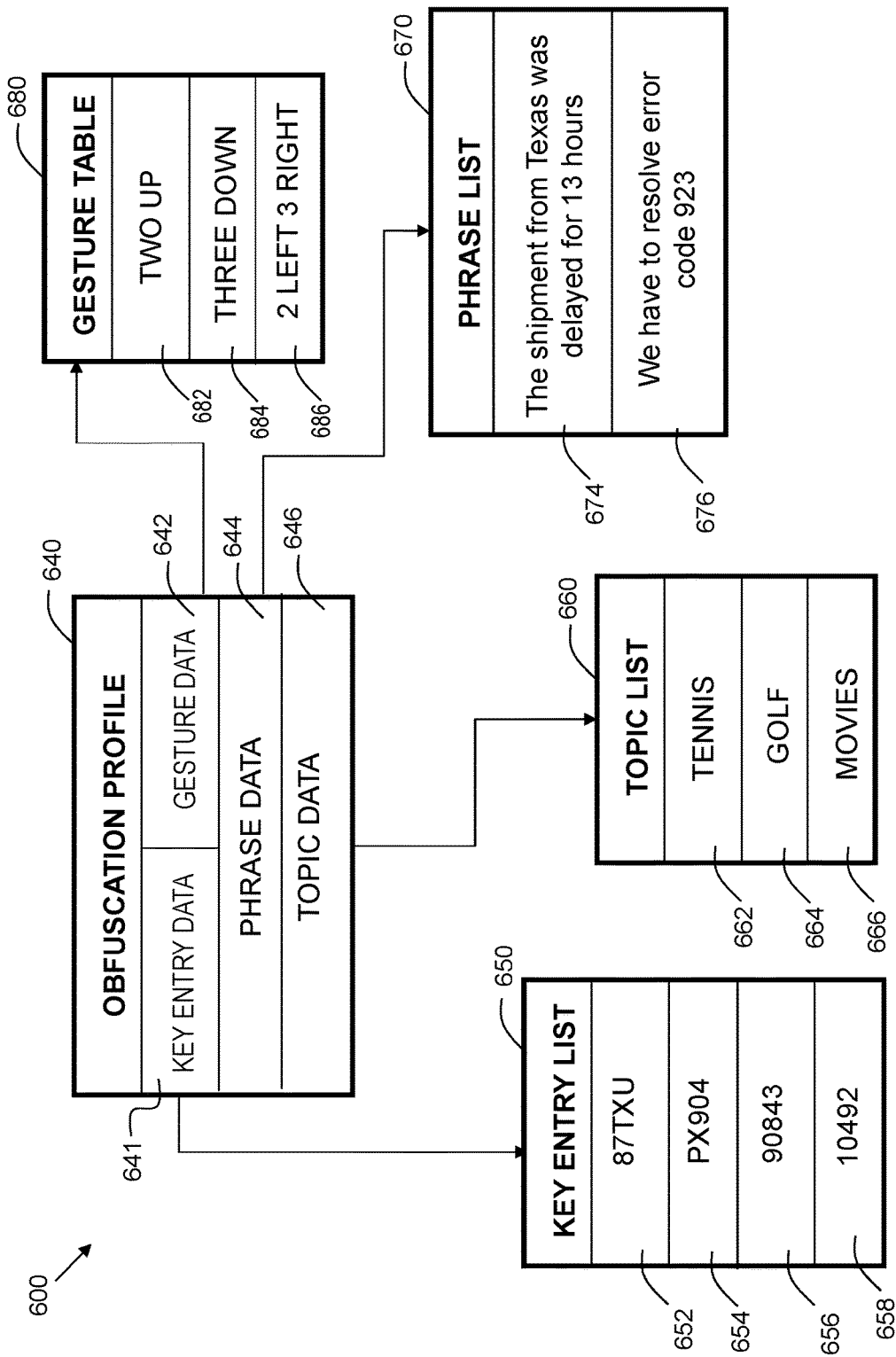
FIG. 6 shows data structures in accordance with embodiments of the present invention.

FIG. 6 shows data structures 600 in accordance with embodiments of the present invention. A user may create a profile indicating transitions. An obfuscation profile 640 includes key entry data 641 and gesture data 642, phrase data 644, and topic data 646.

Key entry list 650 includes textual entries which are indicative of the user transitioning to or from false data. In the example, text entry 87TXU is in field 652, text entry PX904 is in field 654, text entry 90843 is in field 656, and text entry 10492 is in field 658. The text entries of fields 652 and 654 may be used when a user is operating a computing device having an alphanumeric keypad, and the text entries of fields 656 and 658 may be used when the user is using a phone (which only has a numerical pad). A user may enter one of these text entries to the keypad when signaling a transition to or from false data.

Topic entry list 660 includes topics which are indicative of the user transitioning to or from false data. The user may specify these topics, or the system may detect it from natural language processing, machine learning, or artificial intelligence methods. In the example, "tennis" is in field 662, "golf" is in field 664, and "movies" is in field 666. A user may type into the keypad, or orally speak about, one of these topics when signaling to or from false data.

Phrase list 670 includes phrases which are indicative of the user transitioning to or from false data. Field 674 includes the phrase, "The shipment from Texas was delayed for 13 hours." Field 676 includes the phrase, "We have to resolve error code 923." A user may type into the keypad, or orally speak these phrases when signaling a transition to or from false data. These phrases are exemplary, and other phrases may be used instead of, or in addition to, the phrases shown in FIG. 6.

Gesture table 680 includes gestures which are indicative of the user transitioning to or from false data. In embodiments, receiving user input comprises receiving gesture input. In field 682, there is "two up." In field 684, there is "three down." In field 686, there is 2 left 3 right." This may mean two fingers up, three fingers down, or two kicks to the left with three kicks to the right, respectively. A user may use hand gestures, foot gestures, or other type of gesture to indicate to a game console, smartwatch, or smart helmet, etc., when signaling a transition to or from false data.

In embodiments, some or all of the data in data structures 600 may be established as part of an initial setup by the user. In some embodiments, the data in data structures 600 may be initialized to default or random values, with the option for a user to customize one or more of the data fields as desired.

Figure 7:
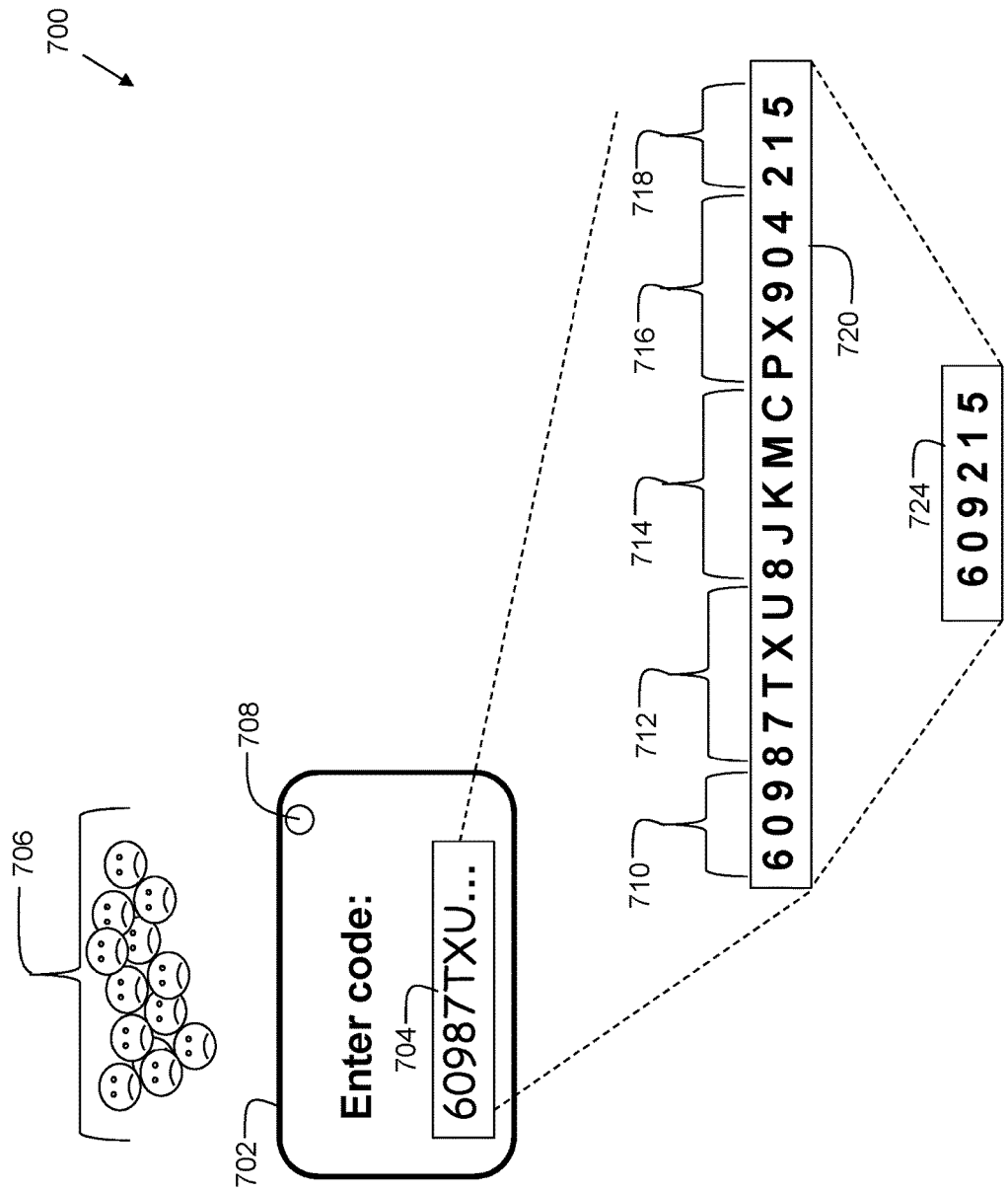
FIG. 7 shows an example of obfuscated keyed input.

FIG. 7 shows an example 700 of obfuscated keyed input. In some embodiments, receiving user input comprises receiving keystroke input. Device 702 includes a field 704 on the user interface and a camera 708. A crowd of people is nearby at 706. A user starts to type true data into the field 704. The user types data 710 as "609". The device then detects the crowd 706, and determines (via camera/microphone/RF scan) that there is a crowd density above a predetermined threshold. In response, the device initiates haptic stimuli, such as via vibration or pneumatic output. The haptic stimuli is perceptible only to the user of device 702, and members of the crowd 706 cannot easily detect the haptic stimuli. Accordingly, the user enters a transitional key entry 712 as "87TXU." A match for such key entry is located by the device (on the key entry list 650 at field 652 of FIG. 6). The user then enters random false data 714 as "8JKMC." The user then enters a transitional key entry 716 as "PX904." A match for such key entry is found by the device on the key entry list 650 at field 654 of FIG. 6. The user then continues to enter true data at 718, as "215." Systems and methods process the entered data, and transmit only the true data. The transitional key entries and false data are excised. Therefore, the entire string of entered text 720 is reduced to the true data 724, which is transmitted as "609215." Thus, embodiments include determining an indication of a start of false user input, processing subsequent user input as false user input, determining an indication of a termination of false user input, and processing subsequent user input as true user input.

Figure 8:
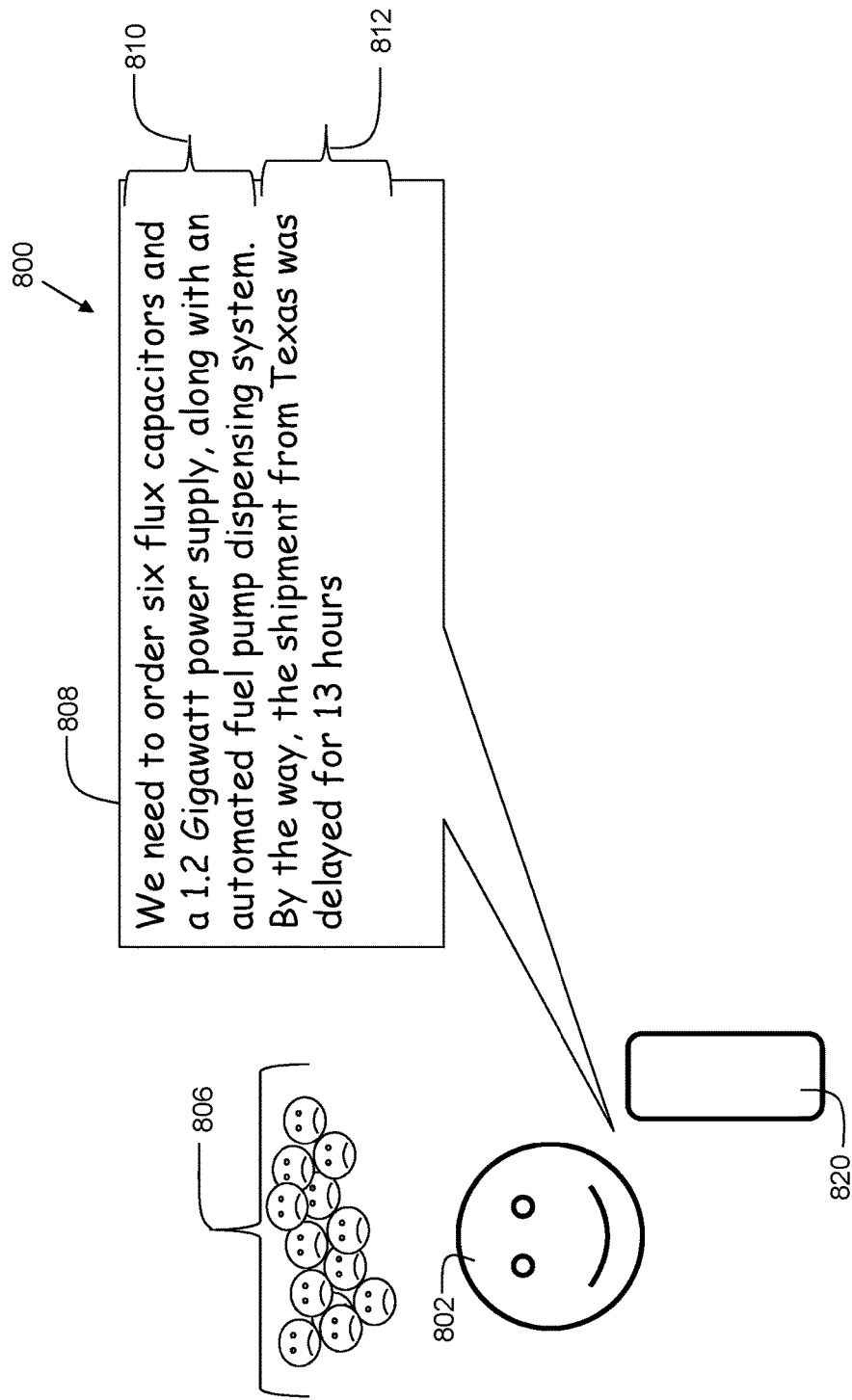
FIG. 8 shows an example of obfuscated uttered input using a phrase list in accordance with embodiments of the present invention.

FIG. 8 shows an example 800 of obfuscated uttered input using a phrase list in accordance with embodiments of the present invention. In some embodiments, receiving user input comprises receiving uttered speech input. User 802 has smartphone 820. The user makes an utterance 808 into a microphone of the smartphone 820. The user utters data 810, "We need to order six flux capacitors and a 1.2 Gigawatt power supply, along with an automated fuel dispensing system." The smartphone 820 performs crowd detection through image analysis, audio analysis, and/or an RF scan process, and detects crowd 806 in the background above a predetermined crowd density level. The smartphone, therefore, initiates haptic stimuli, such as vibration or pneumatic output. The haptic stimuli is perceptible only to user 802, and members of the crowd 806 cannot easily detect the haptic stimuli. Accordingly, the user shortly thereafter utters a transitional phrase 812 such as "By the way, the shipment from Texas was delayed for 13 hours." This is determined to be a transitional phrase (by locating a match stored at field 674 of phrase list 670 in FIG. 6). The utterance indicates the user is signaling entry into false data, and that what follows will be false data until another transitional phrase is uttered for detection by the system. This embodiment is well suited for voicemail applications. As an example, if user 802 is leaving a voicemail message for a recipient, disclosed embodiments redact the transitional phrase, so it is not recorded in the message to the recipient, as its purpose is for obfuscation of the conversation for the crowd 806.

Figure 9:
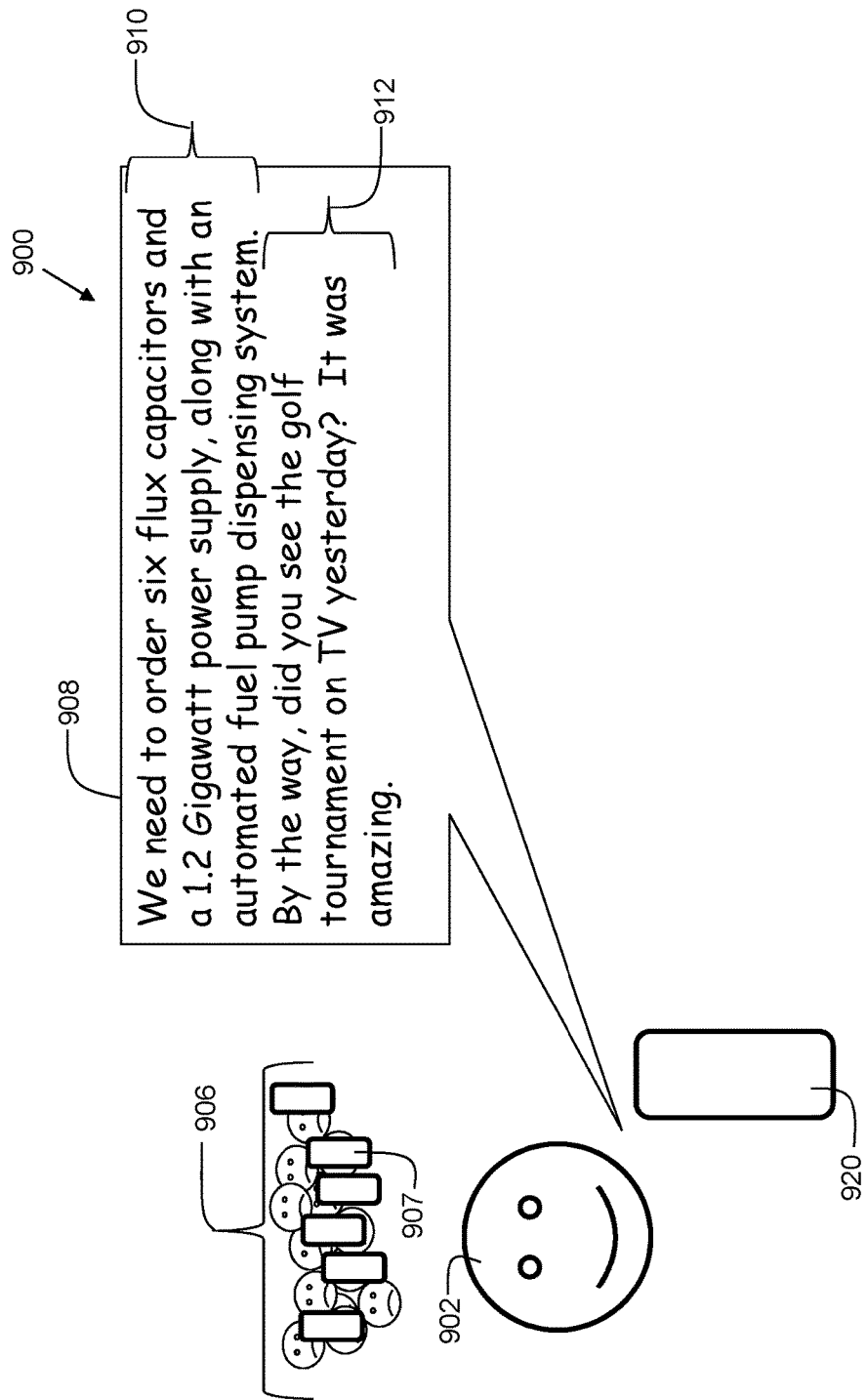
FIG. 9 shows an example of obfuscated uttered input using a topic list in accordance with embodiments of the present invention.

FIG. 9 shows an example 900 of obfuscated uttered input using a topic list in accordance with embodiments of the present invention. User 902 has smartphone 920. The user makes an utterance 908 into a microphone of the smartphone 920. The user utters verbal data (speech) 910 "We need to order six flux capacitors and a 1.2 Gigawatt power supply, along with an automated fuel dispensing system." The smartphone 920 detects crowd 906 in the background via an RF scan, detecting the mobile devices (indicated generally as 907) that belong to members of crowd 906, and determines that the crowd density is above a predetermined threshold. The smartphone, therefore, initiates haptic stimuli, such as vibration or pneumatic output. The haptic stimuli is perceptible only to user 902, and members of the crowd 906 cannot easily detect the haptic stimuli. Accordingly, the user utters verbal data 912 including a transitional topic as "By the way, did you see the golf tournament on TV yesterday? It was amazing." It is determined that "golf" is a transitional topic (by locating a match stored at field 664 of topic list 660 in FIG. 6). The utterance indicates the user is signaling entry into false data, and that what follows will be false data until another transitional topic is uttered for detection by embodiments. In this embodiment, topics are specified a priori as transitional topics. However, the phrases are not established a priori. Instead, natural language processing, including techniques such as entity detection, automatic summarizing, and disambiguation are used to determine the currently uttered topic. Thus, this embodiment does not require the establishment of specific phrases as part of a setup process.

Figure 10:
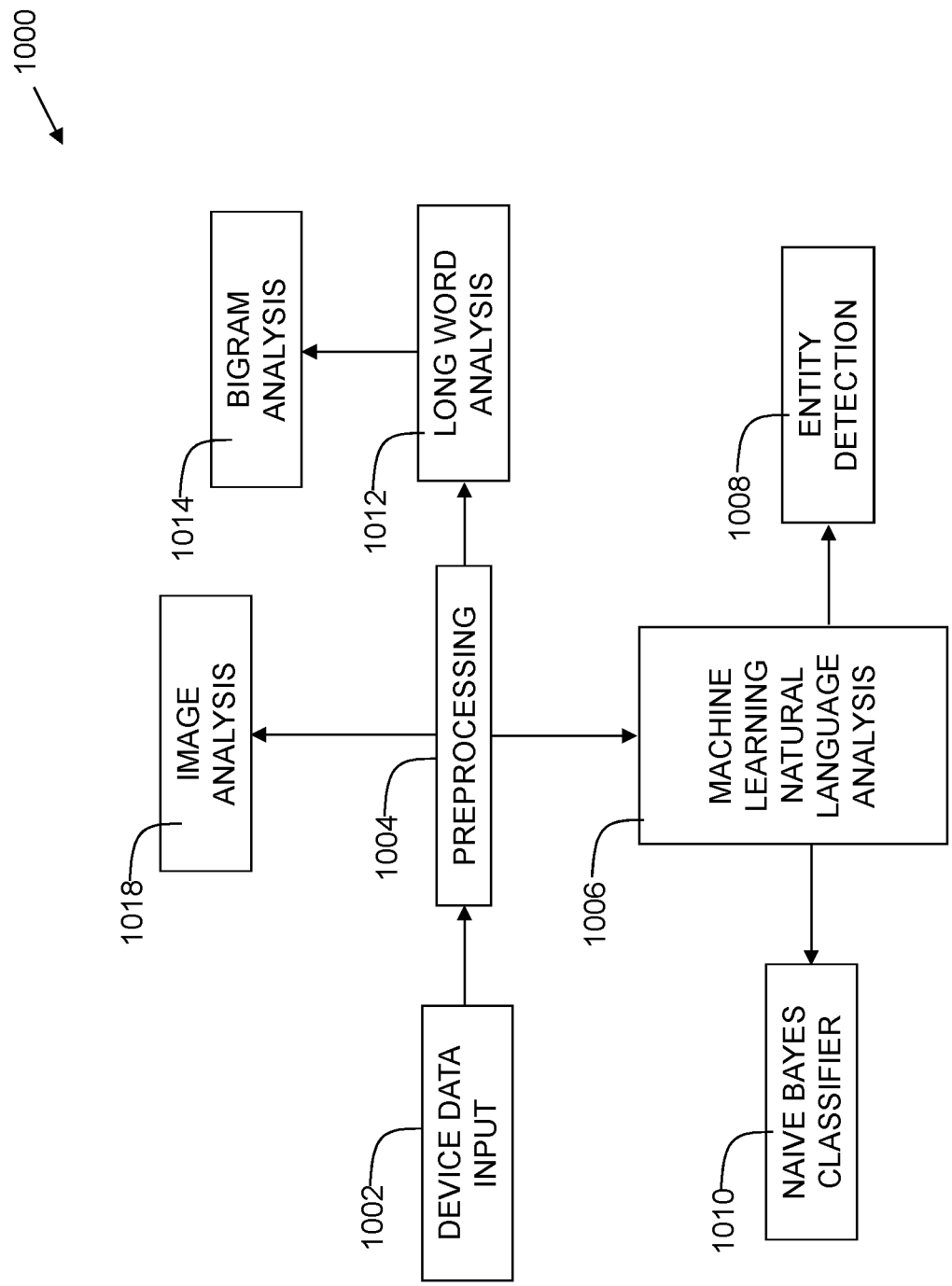
FIG. 10 is a flowchart indicating process steps for device data input processing in accordance with embodiments of the present invention.

FIG. 10 is a flowchart 1000 indicating process steps for device data input processing in accordance with embodiments of the present invention. At 1002, the input is ingested into a natural language processing system that may reside, at least in part, on the user's electronic device. The ingest may include importing of text or speech (via speech-to-text processing), and/or any other suitable method. At 1004, the data from the ingest is then preprocessed for indexing. This includes performing a computer-generated topic analysis for each knowledge base item. The topic analysis can be used to generate keywords that are associated with the input. An index, comprising at least one entry for each knowledge base item, is created for use as a potential solution in a solution path. This information may be stored in another knowledge base, and/or in the storage of the automated technical support system.

User input can include one or more topic keywords associated therewith. In embodiments, a machine learning natural language analysis 1006 of the input is performed. The natural language analysis may include, but is not limited to, indexing, concordance, stop word processing, bigram processing, dispersion analysis, lexical richness analysis (ratio of distinct words to total words), disambiguation, part-of-speech analysis, anaphora resolution (the process of identifying what a pronoun or noun phrase refers to), or any other suitable process.

In some embodiments, the machine learning natural language analysis 1006 comprises performing an entity detection process 1008 on text data from user input. A topic is then derived based on each entity detected from the entity detection process. The derived topic and corresponding knowledge base item is recorded in a topic index. The topic index includes entries of topic keywords assigned to various fragments of input (i.e., portions of data). The index may be comprised of database tables. Any suitable configuration of the index is included within the scope of the invention.

The entity detection may include extraction, which is the detection and preparation of named entity occurrences. The extraction phase includes POS (part of speech) tagging, tokenization, sentence boundary detection, capitalization rules, and/or other statistics. The entity detection may further include noun identification, followed by identifying a subset of nouns including proper nouns and nouns deemed to be topically pertinent. The extracted entities may be used as keywords to populate a topic index.

In some embodiments, the computerized natural language analysis 1006 comprises performing a long word analysis at 1012, which may include a bigram analysis at 1014. In some embodiments, performing a computerized natural language analysis 1006 comprises using a naive Bayes classifier at 1010. Other classifiers and/or machine learning techniques may be used with embodiments of the present invention. In some embodiments, a regression analysis may be used to derive a correlation between topics and corresponding fragments of input.

At 1018, the topic analysis for each fragment of input comprises performing an image analysis for the input. The image analysis may include using edge detection processes, gradient detection processes, and other suitable processes to detect and identify objects in an image. Based on the identification, one or more topic keywords may be assigned to the fragment. For example, if an image of a hard disk drive is present in an image included in device data input 1002, then a keyword of "hard disk drive" may be entered as an entry in a topic index.

FIG. 11 shows an example 1100 of a bigram analysis in accordance with embodiments of the present invention. Bigram analysis is one of the computerized natural language analysis processes that may be utilized in embodiments of the present invention for discerning the topics from input. In some embodiments, the topic analysis comprises a long word analysis. The long word analysis may include performing a bigram analysis. In a bigram analysis, a pair of words in a particular order may be searched for within a body of text of an input query and/or a verbal utterance. Based on the analyses, one or more topic keywords may be assigned to the input. In this example, the bigram "computer storage" is searched within a text excerpt. Three occurrences, indicated as 1102A, 1102B, and 1102C are present in the text passage. In embodiments, the usage of bigrams, trigrams, or more generally, n-grams (number=n), may be used to improve relevance in discerning the topics of the text entered into an electronic computing device by a user.

Figure 12:
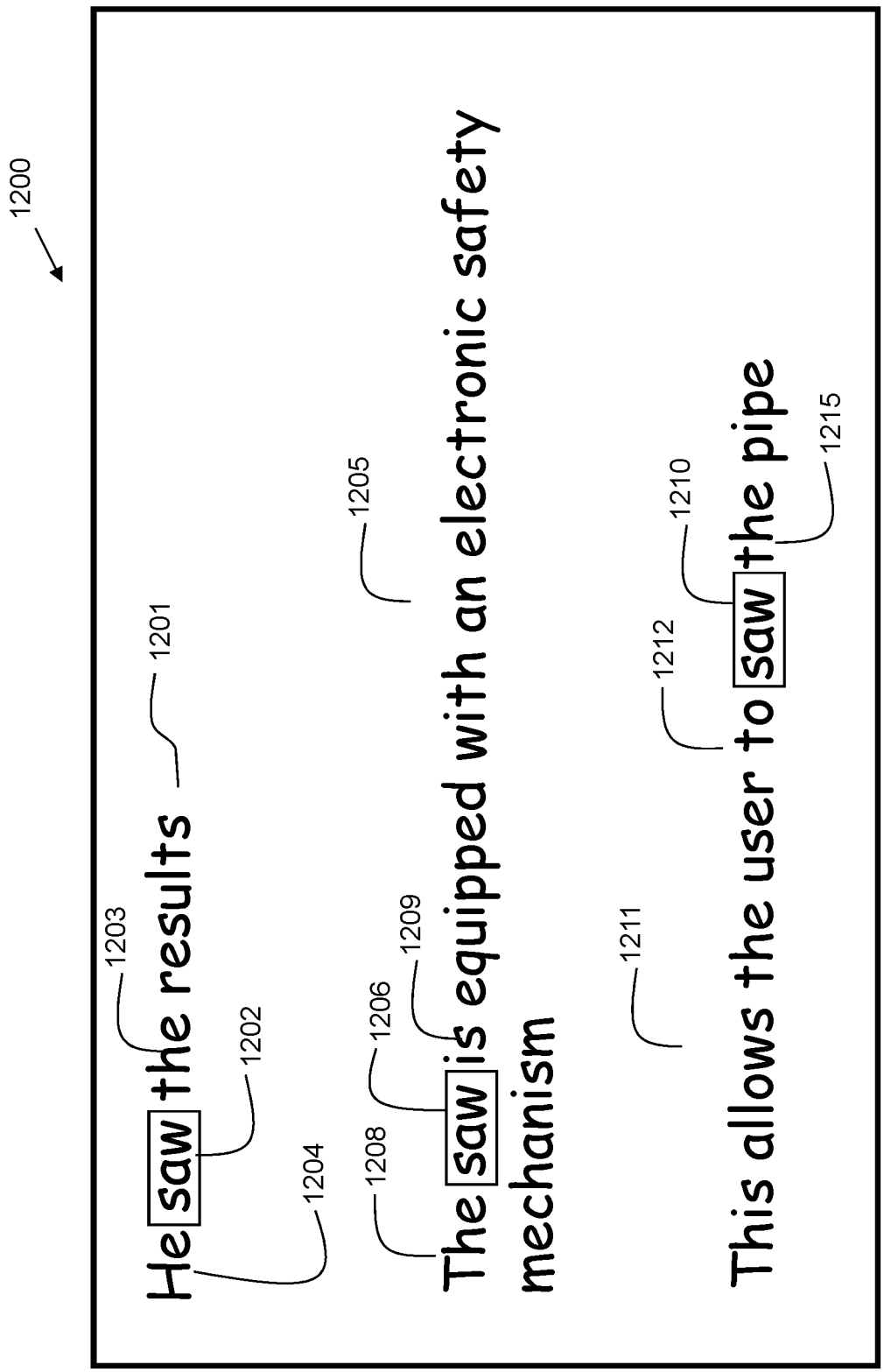
FIG. 12 shows an example of disambiguation in accordance with embodiments of the present invention.

FIG. 12 shows an example of disambiguation in accordance with embodiments of the present invention. Disambiguation is one of the computerized natural language analysis processes that may be utilized in embodiments of the present invention for discerning the topics from an input. Text (or verbal utterances transcribed to text) may be tokenized into words and tagged with parts of speech. For some words, there can be more than one meaning and/or part of speech.

Example 1200 shows a disambiguation example with the word "saw." In phrase 1201, the word "saw" 1202 is a past tense verb. In embodiments, a machine learning natural language analysis module may identify the prior token 1204 to the word "saw" as a pronoun, and the following token 1203 as an article. In training a classifier, the pattern of pronoun-token-article may be associated with a verb, and thus the token is interpreted as a verb.

In phrase 1205, the word "saw" 1206 is a noun for a cutting tool. In embodiments, a machine learning natural language analysis module may identify the prior token 1208 to the word saw as an article, and the following token 1209 as a verb. In training a classifier, the pattern article-token-verb may be associated with a noun, and thus the token is interpreted as a noun.

In phrase 1211, the word "saw" 1210 is an infinitive verb. In embodiments, a machine learning natural language analysis module may identify the prior token 1212 to the word "saw" as part of an infinitive form, and the following token 1215 as an article. In training a classifier, the pattern "to"-token-article may be associated with a verb, and thus the token is interpreted as a verb. These classifiers and techniques for disambiguation are examples, and other classifiers and techniques are possible.

As can now be appreciated, disclosed embodiments provide techniques for improved electronic communication. A crowd density is determined based on audio, image, and/or radio frequency analysis. If the crowd density exceeds a predetermined level, a discrete haptic signal is provided, prompting the user to provide false data. The false data can be keyed input (e.g., keyboard or numeric keypad), verbal utterances (e.g., speech), and/or gestures. The false data serves to obfuscate the true data. In some embodiments, security is further enhanced by generating a keypair based on the content and/or timing of the false data. This provides a random element that can be used to encrypt content prior to sending it to a remote computing device. Thus, disclosed embodiments serve to protect the privacy of electronic communications, reducing the risk of identity theft and/or other security breaches.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for obfuscating communication of a user, comprising:
   receiving user input on an electronic communication device;
   measuring a crowd density proximate to the electronic communication device;
   responsive to a measure of crowd density, initiating a series of haptic stimuli on the electronic communication device, wherein for each instance of haptic user stimulus the method includes:
   determining an indication of a start of false user input;
   processing subsequent user input as false user input;
   determining an indication of a termination of false user input; and
   processing subsequent user input as true user input.

2. The method of claim 1, wherein measuring the crowd density comprises performing image analysis on one or more images from a camera on the electronic communication device.

3. The method of claim 1, wherein measuring the crowd density comprises performing audio analysis on one or more audio samples from a microphone on the electronic communication device.

4. The method of claim 1, wherein measuring the crowd density comprises performing a radio frequency scan.

5. The method of claim 1, wherein receiving user input comprises receiving keystroke input.

6. The method of claim 1, wherein receiving user input comprises receiving uttered speech input.

7. The method of claim 1, wherein receiving user input comprises receiving gesture input.

8. The method of claim 1, wherein the haptic stimuli include vibration.

9. The method of claim 1, wherein the haptic stimuli include a pneumatic output.

10. The method of claim 5, further comprising:
    generating a haptic keypair based on the processed false user input, wherein the haptic keypair comprises a haptic private key and a haptic public key;
    encrypting the true user input with the haptic private key; and
    sending the haptic public key and the true user input to a remote computing device.

11. The method of claim 1, wherein generating a haptic keypair comprises generating a nonce based on a false user input value.

12. The method of claim 11, wherein generating a haptic keypair further includes generating a nonce based on a false user input duration.

13. An electronic computing device comprising:
    a processor;
    a memory coupled to the processor, the memory containing instructions, that when executed by the processor, perform the steps of:
    receiving user input on an electronic communication device;
    measuring a crowd density proximate to the electronic communication device;
    responsive to a measure of crowd density, initiating a series of haptic stimuli on the electronic communication device, wherein for each instance of haptic user stimulus the processor performs the steps of:
    determining an indication of a start of false user input;
    processing subsequent user input as false user input;
    determining an indication of a termination of false user input; and
    processing subsequent user input as true user input.

14. The electronic computing device of claim 13, wherein the memory further comprises instructions, that when executed by the processor, perform the step of measuring the crowd density by performing image analysis on one or more images from a camera on the electronic communication device.

15. The electronic computing device of claim 13, wherein the memory further comprises instructions, that when executed by the processor, perform the step of measuring the crowd density by audio analysis on one or more audio samples from a microphone on the electronic communication device.

16. The electronic computing device of claim 13, wherein the memory further comprises instructions, that when executed by the processor, perform the step of measuring the crowd density by performing a radio frequency scan.

17. The electronic computing device of claim 13, further comprising a vibrator, and wherein the memory further comprises instructions, that when executed by the processor, perform the step of creating the haptic stimuli with the vibrator.

18. The electronic computing device of claim 13, further comprising a pneumatic output, and wherein the memory further comprises instructions, that when executed by the processor, perform the step of creating the haptic stimuli with the pneumatic output.

19. A computer program product for an electronic communication device comprising a computer readable hardware storage device having program instructions embodied therewith, the program instructions executable by a processor to cause the electronic communication device to:
    receive user input on an electronic communication device;
    measure a crowd density proximate to the electronic communication device;
    responsive to a measure of crowd density, initiate a series of haptic stimuli on the electronic communication device, wherein for each instance of haptic user stimulus the instructions further cause the processor to:
    determine an indication of a start of false user input;
    process subsequent user input as false user input;
    determine an indication of a termination of false user input; and
    process subsequent user input as true user input.

20. The computer program product of claim 19, wherein the computer readable hardware storage device includes program instructions executable by the processor to cause the electronic communication device to:
    generate a haptic keypair based on the processed false user input, wherein the haptic keypair comprises a haptic private key and a haptic public key;
    encrypt the true user input with the haptic private key; and
    send the haptic public key and the true user input to a remote computing device.

* * * * *